US012562296B2

(12) United States Patent
Iwasaki et al.

(10) Patent No.: US 12,562,296 B2
(45) **Date of Patent: *Feb. 24, 2026**

(54) RARE EARTH MAGNET ALLOY, METHOD OF MANUFACTURING SAME, RARE EARTH MAGNET, ROTOR, AND ROTATING MACHINE

(71) Applicant: Mitsubishi Electric Corporation, Tokyo (JP)

(72) Inventors: Akito Iwasaki, Tokyo (JP); Yoshikazu Nakano, Tokyo (JP); Yasutaka Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 690 days.

This patent is subject to a terminal disclaimer.

(21) Appl. No.: 17/634,251

(22) PCT Filed: Sep. 10, 2019

(86) PCT No.: PCT/JP2019/035507
§ 371 (c)(1),
(2) Date: Feb. 10, 2022

(87) PCT Pub. No.: WO2021/048916
PCT Pub. Date: Mar. 18, 2021

(65) Prior Publication Data
US 2022/0336126 A1 Oct. 20, 2022

(51) Int. Cl.
*H01F 1/057* (2006.01)
*C22C 38/00* (2006.01)
*H01F 41/02* (2006.01)

(52) U.S. Cl.
CPC ........... *H01F 1/057* (2013.01); *C22C 38/002* (2013.01); *C22C 38/005* (2013.01); *H01F 41/0293* (2013.01); *C22C 2202/02* (2013.01)

(58) Field of Classification Search
CPC . C22C 2202/02; C22C 38/002; C22C 38/005; H01F 1/057; H01F 1/0571;
(Continued)

(56) References Cited

U.S. PATENT DOCUMENTS 7,314,531 B2 * 1/2008 Ishizaka ................ H01F 1/0577 75/244
11,798,717 B2 * 10/2023 Takeda .................. C22C 38/005
(Continued)

FOREIGN PATENT DOCUMENTS

CN 101238530 A * 8/2008 ............ B22F 1/0044
DE 112014003674 T5 5/2016
(Continued)

OTHER PUBLICATIONS

NPL: on line translation of JP-6359232-B1, Jul. 2018 (Year: 2018).*
(Continued)

*Primary Examiner* — Jie Yang
(74) *Attorney, Agent, or Firm* — XSENSUS LLP

(57) ABSTRACT

Provided is a rare earth magnet alloy having a tetragonal $R_2Fe_{14}B$ crystal structure, including: a main phase containing, as main constituent elements, at least one kind selected from the group consisting of: Nd; La; and Sm, Fe, and B; and a sub-phase containing, as main constituent elements, at least one kind selected from the group consisting of: Nd; La; and Sm, and O, wherein La substitutes for at least one of a Nd(f) site or a Nd(g) site, wherein Sm substitutes for at least one of a Nd(f) site or a Nd(g) site, wherein La segregates in the sub-phase, and wherein Sm is dispersed in the main phase and the sub-phase without segregation.

5 Claims, 6 Drawing Sheets

(58) Field of Classification Search
CPC ... H01F 41/0273; H01F 41/0293; H02K 1/02; H02K 2213/03
See application file for complete search history.

(56) References Cited

U.S. PATENT DOCUMENTS

| | | | |
|---|---|---|---|
| 2002/0062884 A1 | 5/2002 | Kaneko et al. | |
| 2010/0224341 A1 | 9/2010 | Hirose et al. | |
| 2014/0247100 A1 | 9/2014 | Tsubokura et al. | |
| 2014/0286815 A1 | 9/2014 | Ishiyama et al. | |
| 2014/0286816 A1 | 9/2014 | Kato et al. | |
| 2014/0308152 A1 | 10/2014 | Tsubokura et al. | |
| 2021/0043343 A1* | 2/2021 | Takeda | C22C 38/005 |
| 2023/0079836 A1 | 3/2023 | Iwasaki et al. | |
| 2023/0377783 A1 | 11/2023 | Iwasaki et al. | |
| 2023/0420166 A1* | 12/2023 | Iwasaki | B22F 3/24 |
| 2024/0339252 A1* | 10/2024 | Iwasaki | C21D 6/00 |

FOREIGN PATENT DOCUMENTS

| | | | |
|---|---|---|---|
| DE | 112019000590 T5 | 11/2020 | |
| JP | 8-269643 A | 10/1996 | |
| JP | 2002-190404 A | 7/2002 | |
| JP | 2009-231391 A | 10/2009 | |
| JP | 6359232 B1 * | 7/2018 | H01F 1/057 |
| JP | 2018-160669 A | 10/2018 | |
| WO | 2009/041356 A1 | 4/2009 | |
| WO | 2013/054842 A1 | 4/2013 | |
| WO | 2019/111328 A1 | 6/2019 | |

OTHER PUBLICATIONS

NPL: on-line translation of CN 101238530 A, Aug. 2008 (Year: 2008).*

Office Action issued on Jun. 5, 2024, in corresponding German patent Application No. 11 2019 007 700.7, 18 pages.

International Search Report and Written Opinion mailed on Oct. 29, 2019, received for PCT Application PCT/JP2019/035507, Filed on Sep. 10, 2019, 9 pages including English Translation.

Notice of Reasons for Refusal mailed on Jan. 7, 2020, received for Japanese Application 2019-569495, 12 pages including English Translation.

Notice of Reasons for Refusal mailed Jun. 6, 2023, in the corresponding Japanese Application No. 2022-045423, 5 pages.

* cited by examiner

RARE EARTH MAGNET ALLOY, METHOD OF MANUFACTURING SAME, RARE EARTH MAGNET, ROTOR, AND ROTATING MACHINE

CROSS-REFERENCE TO RELATED APPLICATION

The present application is based on PCT filing PCT/JP2019/035507, filed Sep. 10, 2019, the entire contents of which are incorporated herein by reference.

TECHNICAL FIELD

The present invention relates to a rare earth magnet alloy, a method of manufacturing the same, a rare earth magnet, a rotor, and a rotating machine.

BACKGROUND ART

An R-T-B-based permanent magnet including a tetragonal $R_2T_{14}B$ intermetallic compound as a main phase, where R represents a rare earth element, T represents a transition element, such as Fe or Fe partially substituted with Co, and B represents boron, has excellent magnetic characteristics. Accordingly, the R-T-B-based permanent magnet is used for various high-value added components including an industrial motor. When the R-T-B-based permanent magnet is used for the industrial motor, its operating temperature environment often becomes a high-temperature environment of above 100° C., and hence there is a strong desire for the R-T-B-based permanent magnet to achieve high heat resistance. In order for the R-T-B-based permanent magnet to achieve high heat resistance, the characteristics of an R-T-B-based magnet alloy serving as a raw material therefor need to be improved. As a technology for improving the magnetic characteristics of the R-T-B-based magnet alloy, there is known a technology involving replacing Nd with a heavy rare earth element, such as Dy, as R in the R-T-B-based magnet alloy. However, the resource of the heavy rare earth element is distributed unevenly, and besides, its output is also limited, which results in concern about its supply. In view of the foregoing, a technology for improving the magnetic characteristics of the R-T-B-based magnet alloy without increasing the content of the heavy rare earth element in the R-T-B-based magnet alloy has been investigated.

For example, in Patent Literature 1, there is proposed a rare earth sintered magnet which has a composition formula expressed by $(R1_x+R2_y)T_{100-x-y-z}Q_z$, where R1 represents at least one kind of element selected from the group consisting of all the rare earth elements excluding La, Y, and Sc, R2 represents at least one kind of element selected from the group consisting of: La; Y; and Sc, T represents at least one kind of element selected from the group consisting of all the transition elements, and Q represents at least one kind of element selected from the group consisting of: B; and C, and which includes, as a main phase, crystal grains each having a $Nd_2Fe_{14}B$-type crystal structure, in which the composition ratios x, y, and z satisfy 8 at %≤x≤18 at %, 0.1 at %≤y≤3.5 at %, and 3 at %≤z≤20 at %, respectively, and the concentration of R2 is higher in at least part of a grain boundary phase than in the crystal grains of the main phase.

CITATION LIST

Patent Document

Patent Document 1: JP 2002-190404 A

SUMMARY OF INVENTION

Technical Problem

However, the rare earth sintered magnet disclosed in Patent Document 1 has a risk of being significantly reduced in magnetic characteristics along with an increase in temperature.

An object of the present invention is to provide a rare earth magnet alloy, in which a reduction in magnetic characteristics along with an increase in temperature can be suppressed while a heavy rare earth element is replaced with an inexpensive rare earth element.

Solution to Problem

According to one embodiment of the present invention, there is provided a rare earth magnet alloy having a tetragonal $R_2Fe_{14}B$ crystal structure, including: a main phase containing, as main constituent elements, at least one kind selected from the group consisting of: Nd; La; and Sm, Fe, and B; and a sub-phase containing, as main constituent elements, at least one kind selected from the group consisting of: Nd; La; and Sm, and O, wherein La substitutes for at least one of a Nd(f) site or a Nd(g) site, wherein Sm substitutes for at least one of a Nd(f) site or a Nd(g) site, wherein La segregates in the sub-phase, and wherein Sm is dispersed in the main phase and the sub-phase without segregation.

Advantageous Effects of Invention

According to the present invention, the rare earth magnet alloy, in which a reduction in magnetic characteristics along with an increase in temperature can be suppressed while a heavy rare earth element is replaced with an inexpensive rare earth element, can be provided.

DESCRIPTION OF EMBODIMENTS

Embodiments of the present invention are described below with reference to the drawings.

First Embodiment

A rare earth magnet alloy according to a first embodiment of the present invention has a tetragonal $R_2Fe_{14}B$ crystal structure. Herein, R represents a rare earth element selected from the group consisting of: neodymium (Nd); lanthanum (La); and samarium (Sm). Fe represents iron. B represents boron. The reason why R in the rare earth magnet alloy according to the first embodiment having the tetragonal $R_2Fe_{14}B$ crystal structure represents the rare earth element selected from the group consisting of: Nd; La; and Sm is as follows: calculation results of magnetic interaction energy using a molecular orbital method have revealed that a composition in which La and Sm are added to Nd provides a practical rare earth magnet alloy. When the addition amounts of La and Sm are too large, the amount of Nd, which is an element having a high magnetic anisotropy constant and a high saturation magnetic polarization, is reduced, which results in a reduction in magnetic characteristics. Accordingly, it is preferred that composition ratios of Nd, La, and Sm satisfy Nd>(La+Sm). In addition, the rare earth magnet alloy according to the first embodiment includes: a main phase containing, as main constituent elements, at least one kind selected from the group consisting of: Nd; La; and Sm, Fe, and B; and a sub-phase containing, as main constituent elements, at least one kind selected from the group consisting of: Nd; La; and Sm, and O. In the rare earth magnet alloy according to the first embodiment, the sub-phase is present while being dispersed in a grain boundary of the main phase. La segregates in the sub-phase, and Sm is dispersed in the main phase and the sub-phase without segregation. From the viewpoint of further suppressing a reduction in magnetic characteristics along with an increase in temperature, it is preferred that the main phase and the sub-phase each contain the three elements, Nd, La, and Sm. The main phase is hereinafter sometimes referred to as (Nd, La, Sm)FeB crystal phase. In addition, the sub-phase is sometimes referred to as (Nd, La, Sm)O phase. The (Nd, La, Sm) described herein means that Nd is partially substituted with La and Sm. Herein, in the rare earth magnet alloy according to the first embodiment, when the concentration of La in the main phase is represented by $X_1$ and the concentration of La in the sub-phase is represented by $X_2$, $X_2/X_1>1$ is established.

Figure 1:
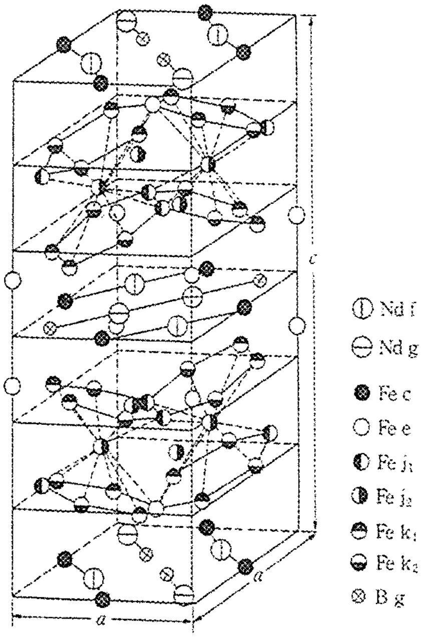
FIG. 1 is a view for illustrating atom sites in a tetragonal $Nd_2Fe_{14}B$ crystal structure.

Next, it is described with reference to FIG. 1 as to which atom sites in the tetragonal $R_2Fe_{14}B$ crystal structure are substituted with La and Sm. FIG. 1 is a view for illustrating atom sites in a tetragonal $Nd_2Fe_{14}B$ crystal structure (reference: J. F. Herbst et al.: PHYSICAL REVIEW B, Vol. 29, No. 7, pp. 4176-4178, 1984). The site to be substituted is judged based on the value for stabilization energy for the substitution, which is determined by band calculation and molecular field approximation of a Heisenberg model.

First, a method of calculating stabilization energy for La is described. The stabilization energy for La may be determined by using a $Nd_8Fe_{56}B_4$ crystal cell based on a difference in energy between $(Nd_7La_{11})Fe_{56}B_4$+Nd and $Nd_8(Fe_{55}La_1)B_4$+Fe. When the value for the energy is smaller, the site substituted with the atom becomes more stable. That is, La easily substitutes for the atom site having the smallest energy among the atom sites. The calculation is performed on the assumption that, when La substitutes for the original atom, the lattice constant of the tetragonal $R_2Fe_{14}B$ crystal structure does not change due to a difference in atomic radius. The stabilization energy for La at each substitution site with varying environmental temperatures is shown in Table 1.

TABLE 1

| Substitution site for La | Temperature 293 K | 500 K | 1,000 K | 1,300 K | 1,400 K | 1,500 K |
|---|---|---|---|---|---|---|
| Nd(f) | −136.372 | −84.943 | −48.524 | −40.132 | −38.132 | −35.451 |
| Nd(g) | −132.613 | −82.740 | −47.442 | −38.211 | −36.358 | −34.753 |
| Fe(k1) | −135.939 | −80.596 | −41.428 | −32.390 | −30.237 | −17.095 |
| Fe(k2) | −127.480 | −75.638 | −38.948 | −30.482 | −28.466 | −26.719 |
| Fe(j1) | −124.248 | −73.076 | −38.003 | −29.754 | −27.791 | −26.089 |
| Fe(j2) | −117.148 | −71.400 | −35.923 | −28.816 | −26.917 | −25.271 |
| Fe(e) | −130.814 | −77.593 | −39.926 | −31.235 | −29.164 | −27.371 |
| Fe(c) | −148.317 | −87.850 | −45.055 | −35.179 | −32.828 | −30.789 |

Unit: eV

According to Table 1, a stable substitution site for La is a Nd(f) site at a temperature of 1,000 K or more, and is an Fe(c) site at temperatures of 293 K and 500 K. As described below, in the case of the rare earth magnet alloy according to the first embodiment, a raw material for the rare earth magnet alloy is heated at a temperature of 1,000 K or more to be melted, followed by being rapidly cooled. It is thus conceived that the raw material for the rare earth magnet alloy is maintained in the state of 1,000 K or more, that is, 727° C. or more. Accordingly, when the rare earth magnet alloy is manufactured by a manufacturing method described below, La is conceived to substitute for the Nd(f) site or a Nd(g) site even at room temperature. Although La is conceived to preferentially substitute for the energetically stable Nd(f) site, La may substitute for the Nd(g) site, which has a smaller difference in energy among the substitution sites for La. This is also supported by the following study report: when a La—Fe—B alloy is melted at 1,073 K (800° C.), followed by being cooled with ice water, a tetragonal $La_2Fe_{14}B$ is formed, that is, La enters a site corresponding to the Nd(f) site or the Nd(g) site of FIG. 1 without entering the Fe(c) site (reference: YAO Qing rong et al.: JOURNAL OF RARE EARTHS, Vol. 34, No. 11, pp. 1121-1125, 2016).

Next, a method of calculating stabilization energy for Sm is described. As for Sm, a difference in energy between $(Nd_7Sm_1)Fe_{56}B_4$+Nd and $Nd_8(Fe_{55}Sm_1)B_4$+Fe is determined. The calculation is performed in the same manner as in the case of La on the assumption that, when Sm substitutes for the atom, the lattice constant of the tetragonal $R_2Fe_{14}B$ crystal structure does not change. The stabilization energy for Sm in each substitution site with varying environmental temperatures is shown in Table 2.

TABLE 2

| Substitution | Temperature | | | | | |
|---|---|---|---|---|---|---|
| site for Sm | 293 K | 500 K | 1,000 K | 1,300 K | 1,400 K | 1,500 K |
| Nd(f) | −164.960 | −101.695 | −56.921 | −46.589 | −44.128 | −41.976 |
| Nd(g) | −168.180 | −103.583 | −57.865 | −47.315 | −44.803 | −42.626 |
| Fe(k1) | −136.797 | −81.098 | −41.679 | −32.583 | −17.350 | −16.343 |
| Fe(k2) | −127.769 | −75.808 | −38.482 | −29.603 | −28.528 | −25.696 |
| Fe(j1) | −122.726 | −73.304 | −37.783 | −28.392 | −26.525 | −24.681 |
| Fe(j2) | −124.483 | −73.883 | −38.072 | −28.483 | −26.610 | −24.985 |
| Fe(e) | 125.937 | 72.525 | 35.301 | 26.633 | 24.450 | 22.782 |
| Fe(c) | −155.804 | −94.457 | −48.359 | −37.720 | −35.187 | −32.992 |

Unit: eV

According to Table 2, it is revealed that a stable substitution site for Sm is the Nd(g) site at each temperature. Although Sm is conceived to preferentially substitute for the energetically stable Nd(g) site, Sm may substitute for the Nd(f) site, which has a smaller difference in energy among the substitution sites for Sm.

As described above, in the rare earth magnet alloy according to the first embodiment, La substitutes for at least one of the Nd(f) site or the Nd(g) site, and Sm substitutes for at least one of the Nd(f) site or the Nd(g) site. When the rare earth magnet alloy has such feature, a reduction in magnetic characteristics along with an increase in temperature is suppressed while a heavy rare earth element, such as Dy, is replaced with an inexpensive rare earth element, and excellent magnetic characteristics can be exhibited even under a high-temperature environment of above 100° C.

Figure 2:
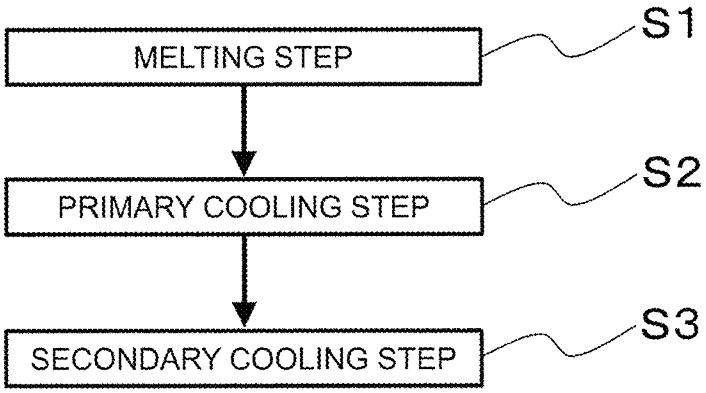
FIG. 2 is a flowchart of a method of manufacturing a rare earth magnet alloy according to one embodiment of the present invention.
Figure 3:
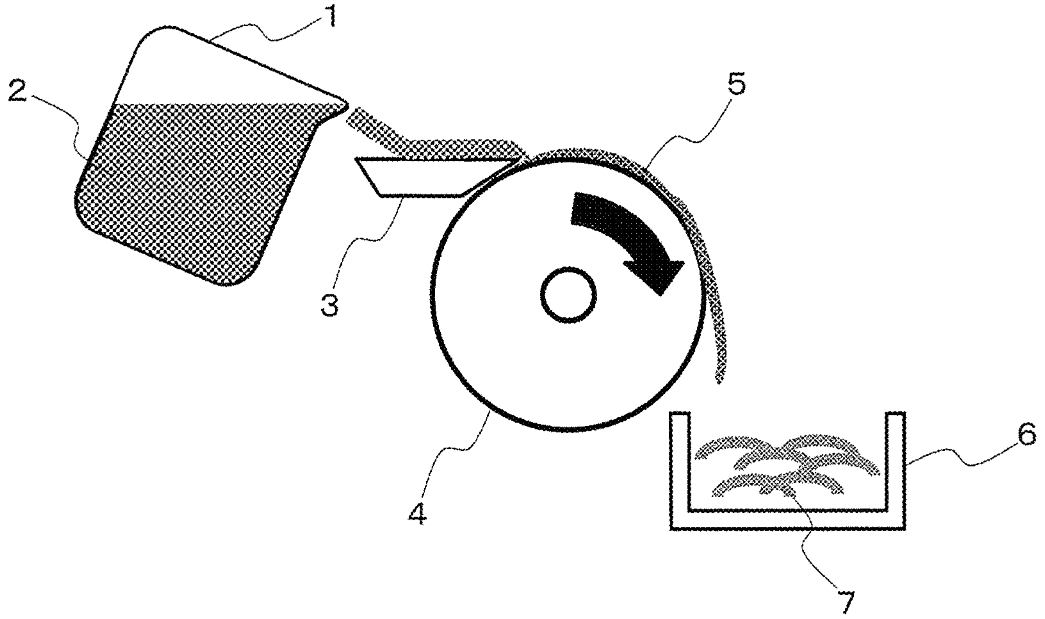
FIG. 3 is a view for schematically illustrating the method of manufacturing the rare earth magnet alloy according to the one embodiment of the present invention.

Next, a method of manufacturing the rare earth magnet alloy according to the first embodiment is described. FIG. 2 is a flowchart of the procedure for manufacturing the rare earth magnet alloy according to the first embodiment. FIG. 3 is a view for schematically illustrating the operation of manufacturing the rare earth magnet alloy according to the first embodiment. As illustrated in FIG. 2, the method of manufacturing the rare earth magnet alloy according to the first embodiment includes: a melting step (S1) of heating a raw material for the rare earth magnet alloy at a temperature of 1,000 K or more to melt the raw material; a primary cooling step (S2) of cooling the raw material in a molten state on a rotating rotary body to obtain a solidified alloy; and a secondary cooling step (S3) of further cooling the solidified alloy in a container. By the manufacturing method including such steps, the rare earth magnet alloy, in which a reduction in magnetic characteristics along with an increase in temperature can be suppressed, can be easily obtained.

In the melting step (S1), as illustrated in FIG. 3, the raw material for the rare earth magnet alloy is heated at a temperature of 1,000 K or more to be melted in a crucible 1 in an atmosphere containing an inert gas, such as argon (Ar), or in vacuum, to thereby provide an alloy melt 2. A combination of materials such as Nd, La, Sm, Fe, and B may be used as the raw material.

In the primary cooling step (S2), as illustrated in FIG. 3, the alloy melt 2 prepared in the melting step (S1) is caused to flow into a tundish 3, and is then rapidly cooled on a single roll 4 while the roll 4 is rotating in a direction of the arrow, to thereby prepare, from the alloy melt 2, a solidified alloy 5 having a smaller thickness than an ingot alloy. The single roll is used as the rotating rotary body in this case, but is not limited thereto. The alloy melt 2 may be rapidly cooled by being brought into contact with a twin roll, a rotating disc, a rotating cylindrical mold, or the like. From the viewpoint of efficiently obtaining the solidified alloy 5 having a small thickness, a cooling rate in the primary cooling step (S2) is set to preferably from 10° C./sec to $10^{7}$° C./sec, more preferably from $10^{3}$° C./sec to $10^{4}$° C./sec. The thickness of the solidified alloy 5 falls within the range of 0.03 mm or more and 10 mm or less. The alloy melt 2 starts to be solidified from a portion brought into contact with the rotary body, and a crystal is grown in a columnar shape (needle shape) in a thickness direction from a contact surface with the rotary body.

In the secondary cooling step (S3), as illustrated in FIG. 3, the solidified alloy 5 having a small thickness prepared in the primary cooling step (S2) is put in a tray container 6 and cooled. The solidified alloy 5 having a small thickness is broken at the time of entering the tray container 6 to become a flake rare earth magnet alloy 7, and is cooled in that state. A ribbon-shaped rare earth magnet alloy 7 may be obtained depending on a cooling rate, and the shape of the rare earth magnet alloy 7 is not limited to a flake shape. From the viewpoint of obtaining the rare earth magnet alloy 7 having a structure having satisfactory temperature characteristics of the magnetic characteristics, the cooling rate in the secondary cooling step (S3) is set to preferably from $10^{-2}$° C./sec to $10^{5}$° C./sec, more preferably from $10^{-1}$° C./sec to $10^{2}$° C./sec. The rare earth magnet alloy 7 obtained through those steps has a fine crystal structure including: a (Nd, La, Sm)FeB crystal phase having a size in a short-axis direction of 3 μm or more and 10 μm or less and a size in a long-axis direction of 10 μm or more and 300 μm or less; and a (Nd, La, Sm)O phase present while being dispersed in a grain boundary of the (Nd, La, Sm)FeB crystal phase. The (Nd, La, Sm)O phase is a non-magnetic phase formed of an oxide having a relatively high concentration of a rare earth element. The thickness of the (Nd, La, Sm)O phase (corresponding to the width of the grain boundary) is 10 μm or less. The rare earth magnet alloy 7 according to the first embodiment undergoes the rapid cooling step, and hence its structure is finer and its crystal grain diameter is smaller than those of a rare earth magnet alloy obtained by a mold casting method. In addition, the (Nd, La, Sm)O phase spreads thinly in the grain boundary, and hence the sintering property of the rare earth sintered magnet alloy 7 is improved.

Second Embodiment

Figure 4:
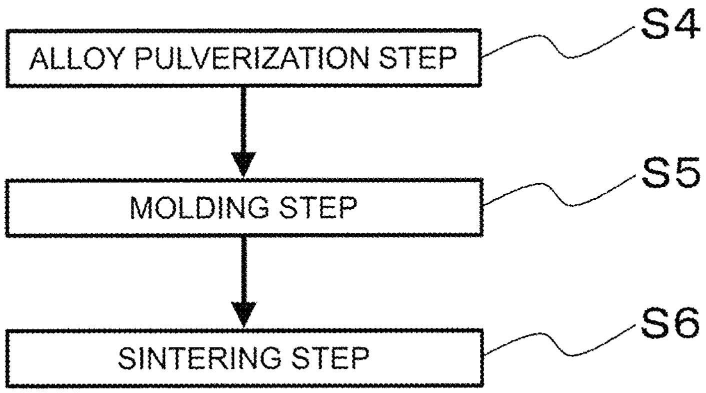
FIG. 4 is a flowchart of a method of manufacturing a rare earth magnet including the rare earth magnet alloy according to the one embodiment of the present invention.

Next, in a second embodiment of the present invention, a method of manufacturing a rare earth magnet using the rare earth magnet alloy according to the first embodiment is described. FIG. 4 is a flowchart of the procedure for manufacturing the rare earth magnet according to the second embodiment.

As illustrated in FIG. 4, a method of manufacturing the magnet according to the second embodiment includes: a pulverization step (S4) of pulverizing the rare earth magnet alloy according to the first embodiment; a molding step (S5) of molding the pulverized rare earth magnet alloy; and a sintering step (S6) of sintering the molded rare earth magnet alloy.

In the pulverization step (S4), the rare earth magnet alloy manufactured in accordance with the method of manufacturing the rare earth magnet alloy according to the first embodiment is pulverized, to thereby obtain rare earth magnet alloy powder having a particle diameter of 200 μm or less, preferably 0.5 μm or more and 100 μm or less. The pulverization of the rare earth magnet alloy may be performed, for example, with an agate mortar, a stamp mill, a jaw crusher, or a jet mill. Particularly when the particle diameter of the powder is to be reduced, it is preferred that the pulverization of the rare earth magnet alloy be performed in an atmosphere containing an inert gas. When the pulverization of the rare earth magnet alloy is performed in the atmosphere containing an inert gas, the mixing of oxygen in the powder can be suppressed. When the atmosphere in which the pulverization is performed does not affect the magnetic characteristics of the magnet, the pulverization of the rare earth magnet alloy may be performed in the atmospheric atmosphere.

In the molding step (S5), the pulverized rare earth magnet alloy is compression-molded, or a mixture of the pulverized rare earth magnet alloy and a resin is heat-molded. The molding of each mode may be performed while a magnetic field is applied. Herein, a magnetic field of, for example, 2 T may be applied. The compression molding may be performed by directly compression-molding the pulverized rare earth magnet alloy, or by compression-molding a mixture of the pulverized rare earth magnet alloy and an organic binder. The resin to be mixed with the rare earth magnet alloy may be a thermosetting resin, such as an epoxy resin, or may be a thermoplastic resin, such as a polyphenylene sulfide resin. When the mixture of the rare earth magnet alloy and the resin is heat-molded, a bonded magnet in the shape of a product can be obtained.

In the sintering step (S6), the compression-molded rare earth magnet alloy is sintered, and thus a permanent magnet can be obtained. In order to suppress oxidation, it is preferred that the sintering be performed in an atmosphere containing an inert gas or in vacuum. The sintering may be performed while a magnetic field is applied. In addition, in order to improve the magnetic characteristics, that is, to increase the anisotropy of the magnetic field or improve a coercive force, a hot processing step or an aging treatment step may be added to the sintering step. Further, a step of causing a compound containing copper, aluminum, a heavy rare earth element, or the like to permeate the crystal grain boundary, which is a boundary between the main phases, may be added.

The permanent magnet and the bonded magnet manufactured through such steps each have a tetragonal $R_2Fe_{14}B$ crystal structure, and include: a main phase containing, as main constituent elements, at least one kind selected from the group consisting of: Nd; La; and Sm, Fe, and B; and a sub-phase containing, as main constituent elements, at least one kind selected from the group consisting of: Nd; La; and Sm, and O. Further, in the permanent magnet and the bonded magnet, La substitutes for at least one of a Nd(f) site or a Nd(g) site, Sm substitutes for at least one of the Nd(f) site or the Nd(g) site, La segregates in the sub-phase, and Sm is dispersed in the main phase and the sub-phase without segregation. Accordingly, in the permanent magnet and the bonded magnet, a reduction in magnetic characteristics along with an increase in temperature can be suppressed.

Third Embodiment

Figure 5:
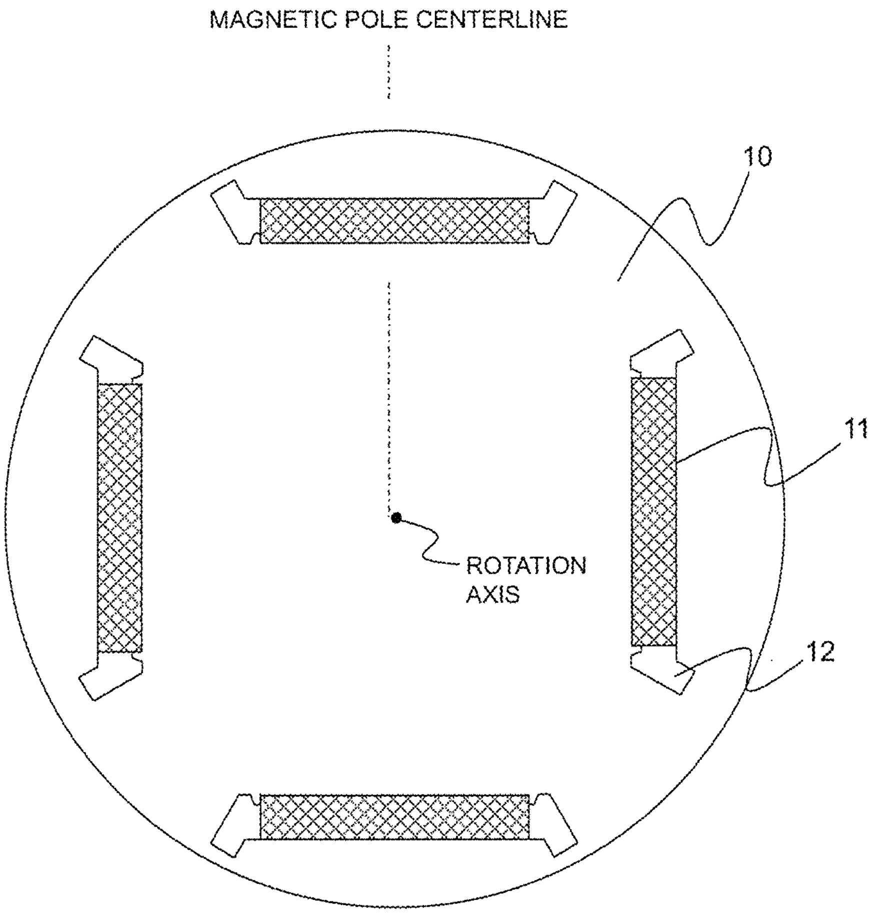
FIG. 5 is a schematic sectional view of a rotor having mounted thereto the rare earth magnet according to the one embodiment of the present invention in a direction perpendicular to an axial direction of the rotor.

Next, a rotor having mounted thereto the rare earth magnet according to the second embodiment is described with reference to FIG. 5. FIG. 5 is a schematic sectional view of the rotor having mounted thereto the rare earth magnet according to the second embodiment in a direction perpendicular to an axial direction of the rotor.

The rotor is rotatable about a rotation axis. The rotor includes: a rotor core 10; and rare earth magnets 11 inserted into magnet insertion holes 12 formed in the rotor core 10 along a circumferential direction of the rotor. While four rare earth magnets 11 are used in FIG. 5, the number of the rare earth magnets 11 is not limited thereto, and may be changed depending on the design of the rotor. In addition, while four magnet insertion holes 12 are formed in FIG. 5, the number of the magnet insertion holes 12 is not limited thereto, and may be changed depending on the number of the rare earth magnets 11. The rotor core 10 is formed by laminating a plurality of disc-shaped electromagnetic steel sheets in an axial direction of the rotation axis.

The rare earth magnet 11 has been manufactured in accordance with the manufacturing method according to the second embodiment. The four rare earth magnets 11 are inserted into the corresponding magnet insertion holes 12. The four rare earth magnets 11 are magnetized so that magnetic poles of the adjacent rare earth magnets 11 on a radially outer side of the rotor differ from each other.

When the coercive force of the permanent magnet is reduced under a high-temperature environment, the operation of the rotor is destabilized. When the rare earth magnet 11 manufactured in accordance with the manufacturing method according to the second embodiment is used as the permanent magnet, the absolute value for a temperature coefficient of the magnetic characteristics is small, and hence a reduction in magnetic characteristics is suppressed even under a high-temperature environment of above 100° C. Consequently, according to the third embodiment, the operation of the rotor can be stabilized even under a high-temperature environment of above 100° C.

Fourth Embodiment

Figure 6:
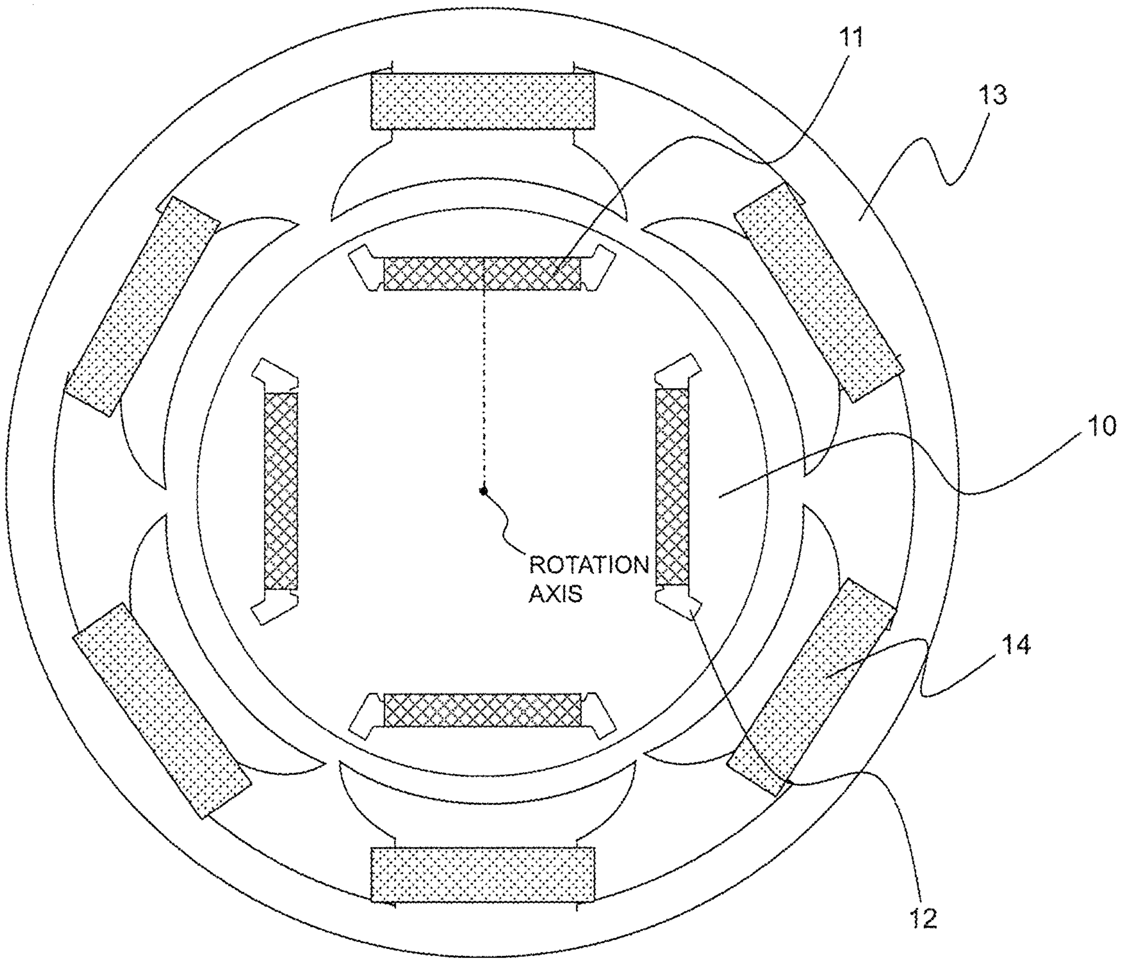
FIG. 6 is a schematic sectional view of a rotating machine having mounted thereto the rare earth magnet according to the one embodiment of the present invention in a direction perpendicular to an axial direction of the rotating machine.

Next, a rotating machine having mounted thereto the rotor according to the third embodiment is described with reference to FIG. 6. FIG. 6 is a schematic sectional view of the rotating machine having mounted thereto the rotor according to the third embodiment in a direction perpendicular to an axial direction of the rotor.

The rotating machine includes: the rotor according to the third embodiment rotatable about a rotation axis; and an annular stator 13 arranged coaxially with the rotor and opposite to the rotor. The stator 13 is formed by laminating a plurality of electromagnetic steel sheets in an axial direction of the rotation axis. The configuration of the stator 13 is not limited thereto, and an existing configuration may be adopted. The stator 13 is provided with a winding 14. The winding manner of the winding 14 is not limited to concentrated winding, and distributed winding may be adopted. The number of magnetic poles of the rotor in the rotating machine only needs to be 2 or more, that is, the number of the rare earth magnets 11 only needs to be 2 or more. In addition, while an interior magnet rotor is adopted in FIG. 6, a surface magnet rotor in which the rare earth magnet 11 is fixed to an outer periphery thereof with an adhesive may be adopted.

When the coercive force of the permanent magnet is reduced under a high-temperature environment, the operation of the rotor is destabilized. When the rare earth magnet 11 manufactured in accordance with the manufacturing method according to the second embodiment is used as the permanent magnet, the absolute value for a temperature coefficient of the magnetic characteristics is small, and hence a reduction in magnetic characteristics is suppressed even under a high-temperature environment of above 100° C. Consequently, according to the fourth embodiment, the rotor can be stably driven and the operation of the rotating machine can be stabilized even under a high-temperature environment of above 100° C.

EXAMPLES

A plurality of samples of rare earth magnet alloys having different compositions of main phases were produced as samples according to Examples 1 to 6 and Comparative Examples 1 to 7. The samples according to Examples 1 to 6 and Comparative Examples 2 to 7 were produced by changing "x" and "y" in a composition formula of $(Nd_{1-x-y}La_xSm_y)_2Fe_{14}B$. Accordingly, the combinations of "x" and "y" in $(Nd_{1-x-y}La_xSm_y)$ in the samples according to Examples 1 to 6 and Comparative Examples 2 to 7 differ from one another. The sample according to Comparative Example 1 was a $Nd_2Fe_{14}B$ magnet alloy including Dy, which was a heavy rare earth element. The composition formulae of the main phases of the samples are shown in Table 3.

TABLE 3

| | Composition of main phase | Temperature coefficient \|α\| [%/° C.] of residual magnetic flux density | Temperature coefficient \|β\| [%/° C.] of coercive force | Judgment: Residual magnetic flux density | Judgment: Coercive force |
|---|---|---|---|---|---|
| Comparative Example 1 | $(Nd_{0.850}Dy_{0.150})_2Fe_{14}B$ | 0.191 | 0.404 | — | — |
| Comparative Example 2 | $(Nd_{0.980}La_{0.020})_2Fe_{14}B$ | 0.190 | 0.409 | Good | Poor |
| Comparative Example 3 | $(Nd_{0.950}La_{0.050})_2Fe_{14}B$ | 0.185 | 0.415 | Good | Poor |
| Comparative Example 4 | $(Nd_{0.850}La_{0.150})_2Fe_{14}B$ | 0.180 | 0.486 | Good | Poor |
| Comparative Example 5 | $(Nd_{0.980}Sm_{0.020})_2Fe_{14}B$ | 0.201 | 0.405 | Poor | Poor |
| Comparative Example 6 | $(Nd_{0.950}Sm_{0.050})_2Fe_{14}B$ | 0.256 | 0.412 | Poor | Poor |
| Comparative Example 7 | $(Nd_{0.850}Sm_{0.150})_2Fe_{14}B$ | 0.282 | 0.456 | Poor | Poor |
| Example 1 | $(Nd_{0.980}La_{0.010}Sm_{0.010})_2Fe_{14}B$ | 0.189 | 0.400 | Good | Good |
| Example 2 | $(Nd_{0.960}La_{0.020}Sm_{0.020})_2Fe_{14}B$ | 0.186 | 0.390 | Good | Good |
| Example 3 | $(Nd_{0.906}La_{0.047}Sm_{0.047})_2Fe_{14}B$ | 0.181 | 0.327 | Good | Good |
| Example 4 | $(Nd_{0.828}La_{0.086}Sm_{0.086})_2Fe_{14}B$ | 0.171 | 0.272 | Good | Good |
| Example 5 | $(Nd_{0.734}La_{0.133}Sm_{0.133})_2Fe_{14}B$ | 0.186 | 0.339 | Good | Good |
| Example 6 | $(Nd_{0.600}La_{0.200}Sm_{0.200})_2Fe_{14}B$ | 0.189 | 0.401 | Good | Good |

Next, a method of analyzing an alloy structure of the rare earth magnet alloy is described. The alloy structure of the rare earth magnet alloy may be determined by elemental analysis with a scanning electron microscope (SEM) and an electron probe micro analyzer (EPMA). Herein, the elemental analysis was performed with a field emission-electron probe micro analyzer (JXA-8530F manufactured by JEOL Ltd.) as a SEM and an EPMA under the conditions of an acceleration voltage of 15.0 kV, an irradiation current of $2.000e^{-008}$ A, an irradiation time of 10 ms, a number of pixels of 256 pixels×192 pixels, a magnification of 2,000 times, and a number of scans of 1.

Next, a method of evaluating the magnetic characteristics of the rare earth magnet alloy is described. The evaluation of the magnetic characteristics may be performed by measuring the coercive forces of a plurality of samples with a pulse excitation-type BH tracer. The maximum application magnetic field of the BH tracer is 6 T or more, which brings the rare earth magnet alloy into a completely magnetized state. Other than the pulse excitation-type BH tracer, a direct current recording fluxmeter, which is also called a direct current-type BH tracer, a vibrating sample magnetometer (VSM), a magnetic property measurement system (MPMS), a physical property measurement system (PPMS), or the like may be used as long as the maximum application magnetic field of 6 T or more can be generated. The measurement is performed in an atmosphere containing an inert gas, such as nitrogen. The magnetic characteristics of each sample are measured at each of a first measurement temperature T1 and a second measurement temperature T2 that differ from each other. A temperature coefficient α [%/° C.] of the residual magnetic flux density is a value obtained by dividing a ratio of a difference between a residual magnetic flux density at the first measurement temperature T1 and a residual magnetic flux density at the second measurement temperature T2 to the residual magnetic flux density at the first measurement temperature T1 by a difference in temperature (T2−T1). In addition, a temperature coefficient β [%/° C.] of the coercive force is a value obtained by dividing a ratio of a difference between a coercive force at the first measurement temperature T1 and a coercive force at the second measurement temperature T2 to the coercive force at the first measurement temperature T1 by a difference in temperature (T2−T1). Accordingly, when the absolute values |α| and |β| for the temperature coefficients of the magnetic characteristics become smaller, a reduction in magnetic characteristics of the magnet along with an increase in temperature is suppressed more.

Figure 7:
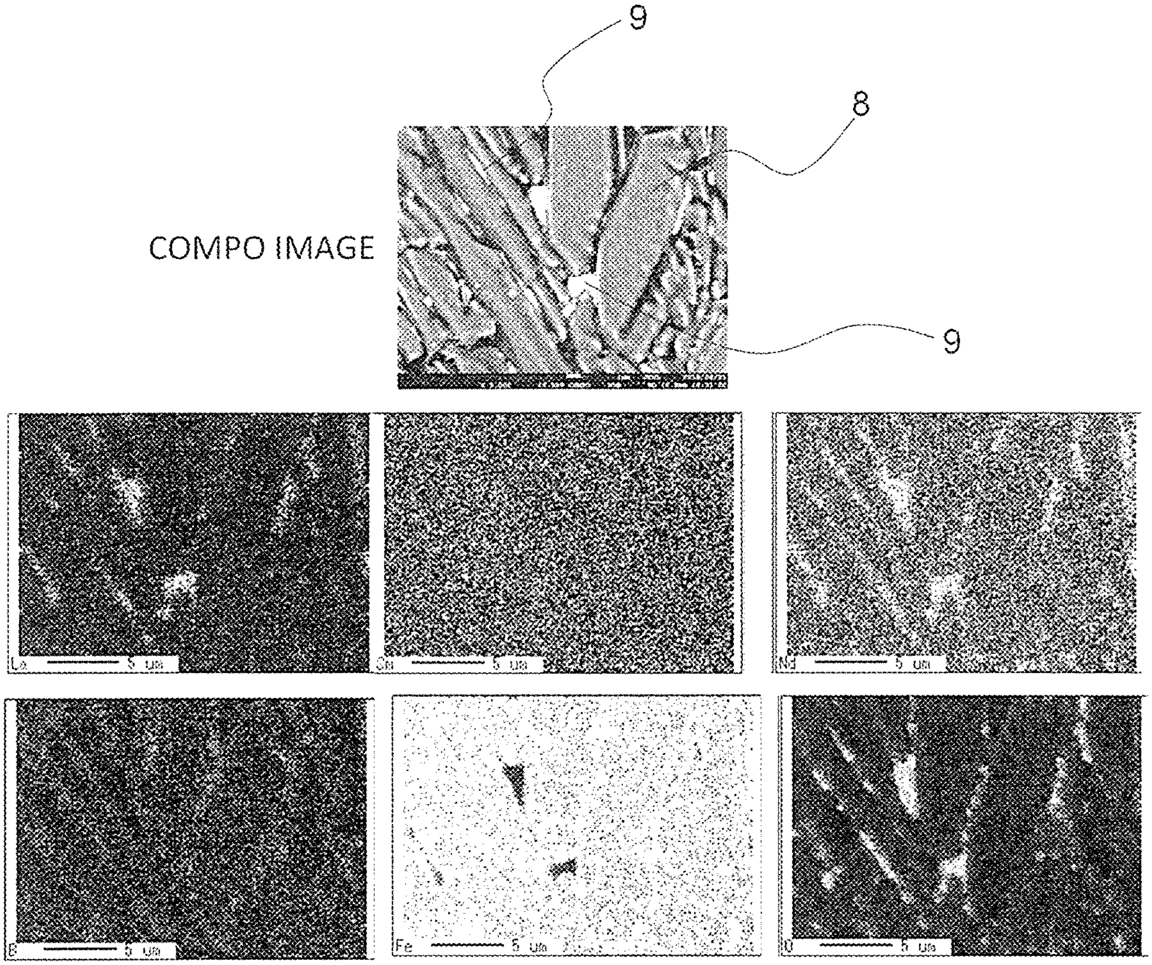
FIG. 7 includes a compositional image (COMPO image) and elemental mapping of a surface of a bonded magnet including the rare earth magnet alloy according to the one embodiment of the present invention.
Figure 8:
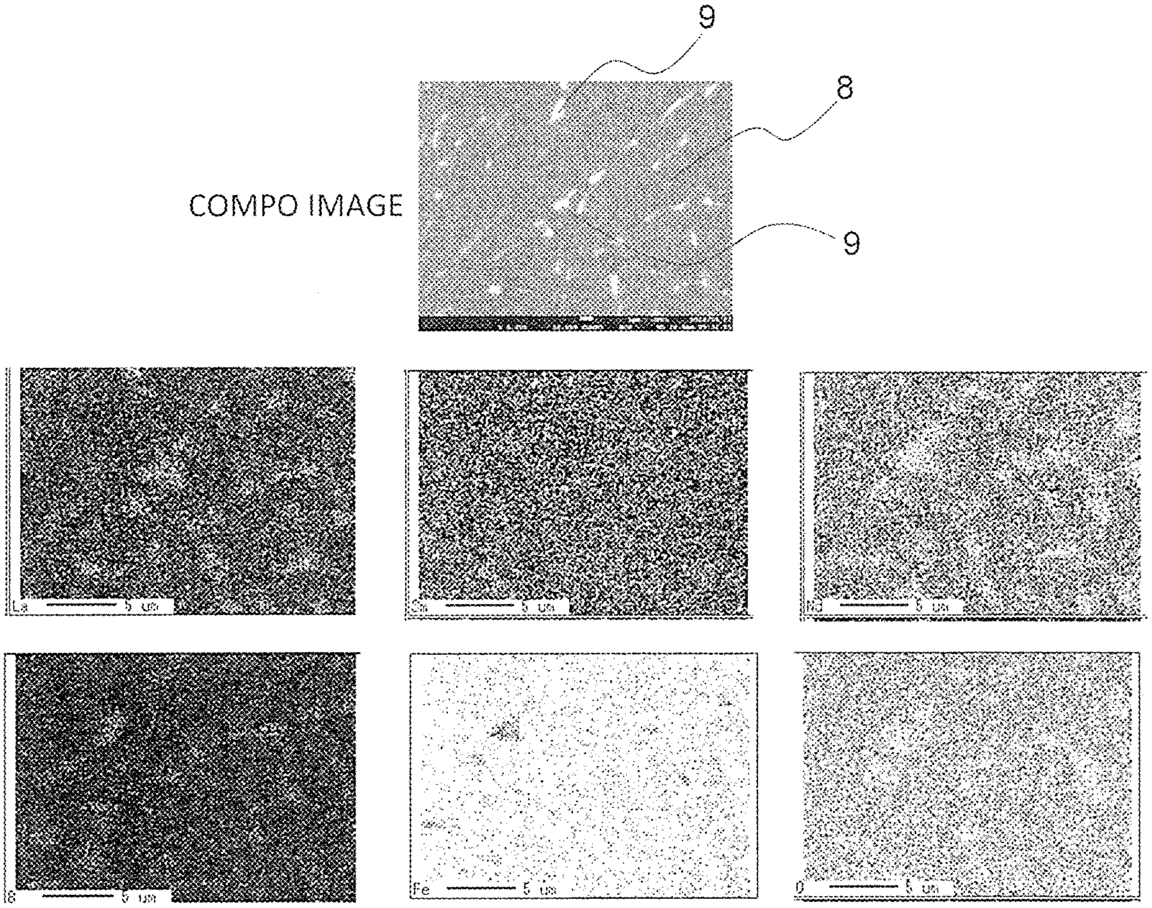
FIG. 8 includes a compositional image (COMPO image) and elemental mapping of a cross section of the bonded magnet including the rare earth magnet alloy according to the one embodiment of the present invention.

First, the analysis results of the samples according to Examples 1 to 6 and Comparative Examples 1 to 7 are described. FIG. 7 includes a compositional image (COMPO image) and elemental mapping obtained by analyzing a surface of a bonded magnet including each of the samples according to Examples 1 to 6 with a field emission-electron probe micro analyzer (FE-EPMA). In addition, FIG. 8 includes a compositional image (COMPO image) and elemental mapping obtained by analyzing a cross section of the bonded magnet including each of the samples according to Examples 1 to 6 with a field emission-electron probe micro analyzer. As shown in FIG. 7 and FIG. 8, in each of the samples according to Examples 1 to 6, it was able to be recognized that a sub-phase 9 serving as the (Nd, La, Sm)O phase was present in a grain boundary of a main phase 8 serving as the (Nd, La, Sm)FeB crystal phase. Further, in each of the samples according to Examples 1 to 6, it was able to be recognized that La segregated in the sub-phase 9, and Sm was dispersed in the main phase 8 and the sub-phase 9 without segregation. Herein, when the concentration of La present in the main phase 8 was represented by $X_1$, and the concentration of La present in the sub-phase 9 was represented by $X_2$, it was able to be recognized from intensity ratios in the elemental mapping obtained through the analysis with an EPMA that $X_2/X_1>1$ was established.

Next, the measurement results of the magnetic characteristics of the samples according to Examples 1 to 6 and Comparative Examples 1 to 7 are described. In order to measure the magnetic characteristics, each of the samples was made in the form of a bonded magnet by mixing powder of the rare earth magnet alloy and a resin, followed by molding through curing of the resin. Each of the samples had a block shape measuring 7 mm in length, width, and height. The first measurement temperature T1 was set to 23° C., and the second measurement temperature T2 was set to 200° C. 23° C. is room temperature. 200° C. is a possible temperature as an operation environment of an automobile motor and an industrial motor. The temperature coefficient α of the residual magnetic flux density was calculated by using the residual magnetic flux density at 23° C. and the residual magnetic flux density at 200° C. In addition, the temperature coefficient β of the coercive force was calculated by using the coercive force at 23° C. and the coercive force at 200° C. The absolute value |α| for the temperature coefficient of the residual magnetic flux density and the absolute value |β| for the temperature coefficient of the coercive force in each of the samples according to Examples 1 to 6 and Comparative Examples 1 to 7 are shown in Table 3. For each of the samples, as compared to |α| and |β| in the sample according to Comparative Example 1, a case of having a lower value was judged as "Good", and a case of having a higher value was judged as "Poor".

The sample according to Comparative Example 1 is a rare earth magnet alloy produced in accordance with the manufacturing method according to the first embodiment by using Nd, Dy, Fe, and FeB as raw materials so that the composition of the main phase became $(Nd_{0.850}Dy_{0.150})_2Fe_{14}B$. The magnetic characteristics of the sample were evaluated in accordance with the above-mentioned method, and as a result, |α| and |β| were found to be 0.191%/° C. and 0.404%/° C., respectively. Those values were used as references.

The sample according to Comparative Example 2 is a rare earth magnet alloy produced in accordance with the manufacturing method according to the first embodiment by using Nd, La, Fe, and FeB as raw materials so that the composition of the main phase became $(Nd_{1-x-y}La_xSm_y)_2Fe_{14}B$ (x=0.020, y=0). The magnetic characteristics of the sample were evaluated in accordance with the above-mentioned method, and as a result, |α| and |β| were found to be 0.190%/° C. and 0.409%/° C., respectively. Accordingly, for the sample, the temperature coefficient of the residual magnetic flux density was judged as "Good", and the temperature coefficient of the coercive force was judged as "Poor". This result reflects the result that the concentration of Nd present in the main phase is increased by causing a La element to segregate in the grain boundary, and thus an excellent magnetic flux density is obtained at room temperature.

The sample according to Comparative Example 3 is a rare earth magnet alloy produced in accordance with the manufacturing method according to the first embodiment by using Nd, La, Fe, and FeB as raw materials so that the composition of the main phase became $(Nd_{1-x-y}La_xSm_y)_2Fe_{14}B$ (x=0.050, y=0). The magnetic characteristics of the sample were evaluated in accordance with the above-mentioned method, and as a result, |α| and |β| were found to be 0.185%/° C. and 0.415%/° C., respectively. Accordingly, for the sample, the temperature coefficient of the residual magnetic flux density was judged as "Good", and the temperature coefficient of the coercive force was judged as "Poor". This result is similar to that of Comparative Example 2, and reflects the result that the concentration of Nd present in the main phase is increased by causing a La element to segregate in the grain boundary, and thus an excellent magnetic flux density is obtained at room temperature.

The sample according to Comparative Example 4 is a rare earth magnet alloy produced in accordance with the manufacturing method according to the first embodiment by using Nd, La, Fe, and FeB as raw materials so that the composition of the main phase became $(Nd_{1-x-y}La_xSm_y)_2Fe_{14}B$ (x=0.150, y=0). The magnetic characteristics of the sample were evaluated in accordance with the above-mentioned method, and as a result, |α| and |β| were found to be 0.180%/° C. and 0.486%/° C., respectively. Accordingly, for the sample, the temperature coefficient of the residual magnetic flux density was judged as "Good", and the temperature coefficient of the coercive force was judged as "Poor". This result is similar to that of Comparative Example 2, and reflects the result that the concentration of Nd present in the main phase is increased by causing a La element to segregate in the grain boundary, and thus an excellent magnetic flux density is obtained at room temperature.

The sample according to Comparative Example 5 is a rare earth magnet alloy produced in accordance with the manufacturing method according to the first embodiment by using Nd, Sm, Fe, and FeB as raw materials so that the composition of the main phase became $(Nd_{1-x-y}La_xSm_y)_2Fe_{14}B$ (x=0, y=0.020). The magnetic characteristics of the sample were evaluated in accordance with the above-mentioned method, and as a result, |α| and |β| were found to be 0.201%/° C. and 0.405%/° C., respectively. Accordingly, for the sample, the temperature coefficient of the residual magnetic flux density was judged as "Poor", and the temperature coefficient of the coercive force was judged as "Poor". This result reflects the result that the addition of Sm alone does not contribute to an improvement in characteristics.

The sample according to Comparative Example 6 is a rare earth magnet alloy produced in accordance with the manufacturing method according to the first embodiment by using Nd, Sm, Fe, and FeB as raw materials so that the composition of the main phase became $(Nd_{1-x-y}La_xSm_y)_2Fe_{14}B$ (x=0, y=0.050). The magnetic characteristics of the sample were evaluated in accordance with the above-mentioned method, and as a result, |α| and |β| were found to be 0.256%/° C. and 0.412%/° C., respectively. Accordingly, for the sample, the temperature coefficient of the residual magnetic flux density was judged as "Poor", and the temperature coefficient of the coercive force was judged as "Poor". This result is similar to that of Comparative Example 5, and reflects the result that the addition of Sm alone does not contribute to an improvement in characteristics.

The sample according to Comparative Example 7 is a rare earth magnet alloy produced in accordance with the manufacturing method according to the first embodiment by using Nd, Sm, Fe, and FeB as raw materials so that the composition of the main phase became $(Nd_{1-x-y}La_xSm_y)_2Fe_{14}B$ (x=0, y=0.150). The magnetic characteristics of the sample were evaluated in accordance with the above-mentioned method, and as a result, |α| and |β| were found to be 0.282%/° C. and 0.456%/° C., respectively. Accordingly, for the sample, the temperature coefficient of the residual magnetic flux density was judged as "Poor", and the temperature coefficient of the coercive force was judged as "Poor". This result is similar to that of Comparative Example 5, and reflects the result that the addition of Sm alone does not contribute to an improvement in characteristics.

The sample according to Example 1 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.010, y=0.010). The magnetic characteristics of the sample were evaluated in accordance with the above-mentioned method, and as a result, |α| and |β| were found to be 0.189%/° C. and 0.400%/° C., respectively. Accordingly, for the sample, the temperature coefficient of the residual magnetic flux density was judged as "Good", and the temperature coefficient of the coercive force was judged as "Good".

The sample according to Example 2 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.020, y=0.020). The magnetic characteristics of the sample were evaluated in accordance with the above-mentioned method, and as a result, |α| and |β| were found to be 0.186%/° C. and 0.390%/° C., respectively. Accordingly, for the sample, the temperature coefficient of the residual magnetic flux density was judged as "Good", and the temperature coefficient of the coercive force was judged as "Good".

The sample according to Example 3 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.047, y=0.047). The magnetic characteristics of the sample were evaluated in accordance with the above-mentioned method, and as a result, |α| and |β| were found to be 0.181%/° C. and 0.327%/° C., respectively. Accordingly, for the sample, the temperature coefficient of the residual magnetic flux density was judged as "Good", and the temperature coefficient of the coercive force was judged as "Good".

The sample according to Example 4 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.086, y=0.086). The magnetic characteristics of the sample were evaluated in accordance with the above-mentioned method, and as a result, |α| and |β| were found to be 0.171%/° C. and 0.272%/° C., respectively. Accordingly, for the sample, the temperature coefficient of the residual magnetic flux density was judged as "Good", and the temperature coefficient of the coercive force was judged as "Good".

The sample according to Example 5 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.133, y=0.133). The magnetic characteristics of the sample were evaluated in accordance with the above-mentioned method, and as a result, |α| and |β| were found to be 0.186%/° C. and 0.339%/° C., respectively. Accordingly, for the sample, the temperature coefficient of the residual magnetic flux density was judged as "Good", and the temperature coefficient of the coercive force was judged as "Good".

The sample according to Example 6 is a rare earth magnet alloy produced in accordance with the manufacturing method according to the first embodiment by using Nd, La, Sm, Fe, and FeB as raw materials so that the composition of the main phase became $(Nd_{1-x-y}La_xSm_y)_2Fe_{14}B$ (x=0.200, y=0.200). The magnetic characteristics of the sample were evaluated in accordance with the above-mentioned method, and as a result, |α| and |β| were found to be 0.189%/° C. and 0.401%/° C., respectively. Accordingly, for the sample, the temperature coefficient of the residual magnetic flux density was judged as "Good", and the temperature coefficient of the coercive force was judged as "Good".

As apparent from the results of Examples 1 to 6, each of the rare earth magnet alloys has the tetragonal $R_2Fe_{14}B$ crystal structure, and includes: the main phase containing, as main constituent elements, the three elements, Nd, La, and Sm, Fe, and B; and the sub-phase containing, as main constituent elements, the three elements, Nd, La, and Sm, and O. Further, in each of the rare earth magnet alloys, La substitutes for at least one of the Nd(f) site or the Nd(g) site, and Sm substitutes for at least one of the Nd(f) site or the Nd(g) site. La segregates in the sub-phase, and Sm is dispersed in the main phase and the sub-phase without segregation. As a result, with the rare earth magnet alloys, a reduction in magnetic characteristics along with an increase in temperature is suppressed while a heavy rare earth element, such as Dy, is replaced with an inexpensive rare earth element, and excellent magnetic characteristics can be exhibited even under a high-temperature environment of above 100° C.

EXPLANATION ON NUMERALS

1 crucible
2 alloy melt
3 tundish
4 single roll

5 solidified alloy
6 tray container
7 rare earth magnet alloy
8 main phase
9 sub-phase
10 rotor core
11 rare earth magnet
12 magnet insertion hole
13 stator
14 winding

The invention claimed is:

1. A rare earth magnet alloy having a tetragonal $R_2Fe_{14}B$ crystal structure, comprising:

a main phase containing, as main constituent elements, Nd, La, Sm, Fe and B; and a crystalline sub-phase containing, as main constituent elements, Nd, La, Sm and O, wherein the crystalline sub-phase is an oxide phase comprising (Nd, La, Sm)O wherein La substitutes for at least one of a Nd(f) site or a Nd(g) site, wherein Sm substitutes for at least one of a Nd(f) site or a Nd(g) site, wherein La segregates in the crystalline sub-phase, wherein Sm is uniformly dispersed in the main phase and the crystalline sub-phase without segregation, wherein the crystalline sub-phase is dispersed in a grain boundary of the main phase, wherein the composition of the main phase is $(Nd_{(1-x-y)}La_{(x)}Sm_{(y)})_2Fe_{14}B$, wherein 1-x-y is between 0.600 and 0.980, x is between 0.010 and 0.200, and y is between 0.010 and 0.200, and wherein a temperature coefficient α (%/° C.) of a residual magnetic flux density of the rare earth magnet alloy is between 0.171 and 0.189.

2. The rare earth magnet alloy according to claim 1, wherein, when a concentration of La in wt % in the main phase is represented by $X_1$ and a concentration of La in wt % in the crystalline sub-phase is represented by $X_2$, $X_2/X_1>1$ is established.

3. The rare earth magnet alloy according to claim 2, wherein composition ratios of Nd, La, and Sm satisfies Nd>(La+Sm).

4. The rare earth magnet alloy according to claim 1, wherein composition ratios of Nd, La, and Sm satisfies Nd>(La+Sm).

5. The rare earth magnet alloy according to claim 1, wherein a temperature coefficient β (%/° C.) of a coercive force of the rare earth magnet alloy is between 0.272 and 0.400.

* * * * *